United States Patent Office 3,483,239
Patented Dec. 9, 1969

3,483,239
NICKEL DITHIOCARBAMATES
Ronald James Hurlock, Leonard Wood, and Vijay Ratna Sharma, Manchester, England, assignors to Imperial Chemical Industries Limited, London, England, a corporation of Great Britain
No Drawing. Filed Jan. 18, 1968, Ser. No. 698,717
Claims priority, application Great Britain, Jan. 26, 1967, 3,962/67
Int. Cl. C07f *15/04;* C07c *155/06*
U.S. Cl. 260—439         5 Claims

ABSTRACT OF THE DISCLOSURE

Nickel dithiocarbamates of the formula

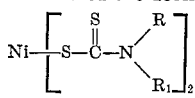

wherein R represents an alkyl, alkenyl, cycloalkyl or aralkyl group or substituted derivative thereof and $R_1$ represents a 3,5-ditert.-alkyl-4-hydroxybenzyl group are prepared by reacting a nickel salt with a dithiocarbamic ester of the formula

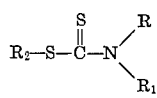

wherein $R_2$ is a group of the type represented by $R_1$. These nickel dithiocarbamates are effective stabilisers of polymers, especially polyolefins such as polypropylene, against degradation by light or heat.

---

This invention relates to nickel dithiocarbamates of value as stabilisers for polymers and a method of manufacture of these nickel dithiocarbamates.

According to the invention there are provided nickel dithiocarbamates of the formula

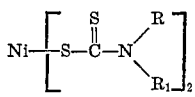

wherein R represents an alkyl, alkenyl, cycloalkyl or aralkyl group or substituted derivative thereof and $R_1$ represents a 3,5-ditert.-alkyl-4-hydroxybenzyl group.

As examples of groups which may be represented by R there may be mentioned alkyl groups such as n-butyl, n-octyl, n-dodecyl, and particularly methyl, cyclohexyl, isopropyl, isobutyl, allyl, hydroxymethyl, β-hydroxyethyl and benzyl.

As examples of 3,5-ditert.-alkyl-4-hydroxybenzyl groups which may be represented by $R_1$ there may be mentioned especially 3,5-di-t-butyl-4-hydroxybenzyl, but also 3,5-di-t-amyl-4-hydroxybenzyl, 3,5-di-t-octyl-4-hydroxybenzyl, 3,5-di-α-methylcyclohexyl-4-hydroxybenzyl and 3,5-di-α,α-dimethylbenzyl-4-hydroxybenzyl.

According to a further feature of the invention there is provided a process for the preparation of nickel dithiocarbamates of the formula

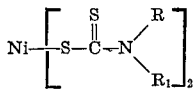

wherein R and $R_1$ have the significances given earlier which comprises reacting a nickel salt with a dithiocarbamic ester of the formula

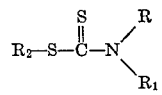

wherein $R_2$ is a group of the type represented by $R_1$.

The process of the invention may be carried out by interacting a nickel salt such as nickel acetate or nitrate, with the dithiocarbamic ester in a suitable solvent such as ethanol or butanol. Preferred proportions of reactants are 2 molar proportions of dithiocarbamic ester to 1 molar proportion of nickel as nickel salt. Suitable reaction temperatures are up to 200° C. although temperatures in the higher part of this range are often not desirable in that some degradation may occur. The nickel dithiocarbamate may be isolated for example by evaporation of the major part of the solvent leaving the nickel thiocarbamate in crystalline form.

The dithiocarbamic esters required for use in the process of the invention are readily available by condensing formaldehyde, a primary amine, and 2,6-ditert.-alkylphenol to give a bis(hydroxybenzyl)amine or substituted derivative thereof which is converted into the dithiocarbamic ester by interaction with carbon disulphide carried out for example in boiling ethanol. The ethanol solution so obtained may be used conveniently in the process of the invention without isolation of the dithiocarbamic ester.

The nickel dithiocarbamates of the invention may be incorporated as stabilisers in polymers by any conventional method. For example by dissolving the nickel dithiocarbamate in a low-boiling solvent and after thoroughly mixing the solution with the polymer in powdered form, evaporating the solvent; or by means of mechanical mixing; or by extrusion compounding.

The nickel dithiocarbamate should be present in the polymer from 0.01 to 5% and preferably from 0.2 to 1% by weight of polymer.

The nickel dithiocarbamate may be used alone or may be used in conjunction with other conventional additives such as soaps, plasticisers, antistatic agents, pigments, dyes and fillers. The use in addition of other antioxidants such as phenolic compounds, metal salts or esters of thiodipropionic acid, dialkyl sulphides, salts or esters of other dialkyldithiocarbamates, dialkyldithiophosphoric acids or salts or esters thereof, alkyl or aryl phosphites or thiophosphites, salts or esters of phosphorus oxy- or thioacids, or esters of boric acid and/or other light stabilisers such as ultra-violet light absorbers commonly used in stabiliser systems for polymers such as polypropylene is usually not necessary.

By the use of the nickel dithiocarbamates polymers, particularly polyolefins such as polypropylene, are stabilised to an exceptional degree against degradation by exposure to light and also against thermal decomposition.

The invention is illustrated but not limited by the following examples in which all parts and percentages are by weight unless otherwise specified.

EXAMPLE 1

A solution of 10.86 parts of 2,6-di-t-butyl-4-[N-(3,5-di-t-butyl-4-hydroxybenzyl)-N-methylthiocarbamoylthiomethyl]phenol and 2.37 parts of nickel chloride hexahydrate in 400 parts of ethanol is boiled for one hour. Nickel N-(3,5-di-t-butyl-4-hydroxybenzyl)-N-methyldithiocarbamate separates out as the reaction proceeds. The cooled product is collected and washed to give green crystals melting at 264° C. (Found: Ni=8.3%; $C_{34}H_{50}N_2NiO_2S_4$ requires Ni=8.4%).

EXAMPLE 2

Polypropylene is blended with nickel bis-N-(3,5-di-t-butyl-4-hydroxybenzyl)-N-methyldithiocarbamate and pressed for 3 minutes at 180° C. in a steam heated platen press followed by cooling under pressure to give test sheets of thickness about 0.75 mm. The pressed sheets are aged in an air oven at 150° C. and the time to degrade the polypropylene as indicated by embrittlement is determined.

TABLE 1

| Polypropylene | Parts | | |
|---|---|---|---|
| | 100 | 100 | 100 |
| Nickel bis-[N-(3,5-di-tert.-butyl-4-hydroxybenzyl)-N-methyldithiocarbamate] | 0.5 | 1.0 | ...... |
| Time to embrittlement at 150° C. (hours) | 255 | 638 | <12 |

EXAMPLE 3

Polypropylene is blended with the additives listed in Table 2 and spun into yarn at 225° C., drawn to an 8× draw ratio and aged in a Cyanamid Fluorescent Sunlamp/Black Light ageing unit. The effectiveness of the stabiliser system is expressed as a function of the strength retention after 250 hours exposure and is given in Table 2. Comparison is made with the commercial U.V. stabiliser system of 2-hydroxy-4-octyloxybenzophenone, 1,1,3-tris-(5 - tert. - butyl - 4 - hydroxy-2-methylphenyl)butane and dilaurylthiodipropionate in conjunction, and with nickel dinonyl dithiocarbamate.

TABLE 2

| Polypropylene | Parts | | | |
|---|---|---|---|---|
| | 100 | 100 | 100 | 100 |
| Nickel bis-[N-(3,5-di-tert.-butyl-4-hydroxybenzyl)-N-methyldithiocarbamate] | 0.5 | | | |
| Calcium stearate | 0.4 | 0.4 | 0.4 | 0.4 |
| 2-Hydroxy-4-octyloxybenzophenone | | | 0.5 | 0.5 |
| 1,1,3-Tris-(5-tert.-butyl-4-hydroxy-2-methylphenyl)butane | | | | 0.1 |
| Dilaurylthiodipropionate | | | | 0.5 |
| Nickel dinonyldithiocarbamate | | | 0.5 | |
| % strength retention of yarn after 250 hours' ageing | 89 | 25 | 50 | 59 |

We claim:
1. Nickel dithiocarbamates of formula

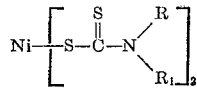

wherein R represents an alkyl, alkenyl, cycloalkyl or aralkyl group or substituted derivative thereof and $R_1$ represents a 3,5-ditert.-alkyl-4-hydroxybenzyl group.

2. Nickel dithiocarbamates as claimed in claim 1 wherein R represents a methyl group.

3. Nickel dithiocarbamates as claimed in claim 1 wherein $R_1$ represents a 3,5-di-t-butyl-4-hydroxybenzyl group.

4. A process for the preparation of nickel dithiocarbamates as claimed in claim 1 wherein R and $R_1$ have the significances given earlier, which comprises reacting a nickel salt with a dithiocarbamic ester of the formula

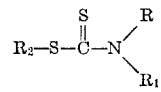

wherein $R_2$ is a group of the type represented by $R_1$.

5. A process as claimed in claim 4 wherein the molar proportions of dithiocarbamic ester to nickel salt are 2:1.

References Cited

UNITED STATES PATENTS 3,381,026  4/1968  O'Shea _____ 260—455
3,412,026  11/1968  Booher _____ 252—33.3

DELBERT E. GANTZ, Primary Examiner

A. P. DEMERS, Assistant Examiner

U.S. Cl. X.R.

260—45.75, 455